United States Patent
Toyama

(10) Patent No.: US 8,118,671 B2
(45) Date of Patent: Feb. 21, 2012

(54) IMAGE DISPLAY APPARATUS, IMAGE DISPLAY METHOD, AND IMAGE DISPLAY SYSTEM

(75) Inventor: Keiichiro Toyama, Kanagawa (JP)

(73) Assignee: Sony Computer Entertainment Inc., Tokyo (JP)

( * ) Notice: Subject to any disclaimer, the term of this patent is extended or adjusted under 35 U.S.C. 154(b) by 1177 days.

(21) Appl. No.: 11/296,692

(22) Filed: Dec. 7, 2005

(65) Prior Publication Data
US 2006/0135256 A1   Jun. 22, 2006

Related U.S. Application Data

(63) Continuation of application No. PCT/JP2004/007970, filed on Jun. 8, 2004.

(30) Foreign Application Priority Data

Jun. 11, 2003  (JP) .................................. 2003-166403

(51) Int. Cl.
  *A63F 9/24*    (2006.01)
  *A63F 13/00*   (2006.01)
  *G06F 17/00*   (2006.01)
  *G06F 19/00*   (2011.01)
(52) U.S. Cl. ................. 463/31; 463/32; 463/33; 463/34
(58) Field of Classification Search ............... 463/31–33
    See application file for complete search history.

(56) References Cited

U.S. PATENT DOCUMENTS

| | | | | |
|---|---|---|---|---|
| 6,183,367 B1 * | 2/2001 | Kaji et al. | ........................ | 463/42 |
| 6,241,609 B1 * | 6/2001 | Rutgers | ........................... | 463/31 |
| 6,271,854 B1 * | 8/2001 | Light | ............................ | 345/427 |
| 6,283,857 B1 * | 9/2001 | Miyamoto et al. | .............. | 463/31 |
| 7,027,600 B1 * | 4/2006 | Kaji et al. | ........................ | 381/17 |
| 2001/0049300 A1 * | 12/2001 | Okamoto et al. | ............... | 463/30 |
| 2002/0151338 A1 | 10/2002 | Taguchi | | |
| 2002/0190989 A1 * | 12/2002 | Kamata et al. | ................ | 345/440 |

FOREIGN PATENT DOCUMENTS

| | | |
|---|---|---|
| EP | 0913175 | 5/1999 |
| EP | 0990458 | 4/2000 |
| JP | 11-070272 | 3/1999 |

(Continued)

OTHER PUBLICATIONS

"Super Mario 64," Sep. 26, 1996, Nintendo, game manual.*

(Continued)

*Primary Examiner* — Dmitry Suhol
*Assistant Examiner* — Kevin Y. Kim
(74) *Attorney, Agent, or Firm* — Katten Muchin Rosenman LLP

(57) ABSTRACT

An image display apparatus which realizes a new visual effect is provided. According to a game apparatus 10 of the present invention, images from the viewpoints of a plurality of characters in a virtual space can be switched arbitrarily. A first processing unit 22 is in charge of an image from the viewpoint of a main character, and a second processing unit 24 is in charge of images from the viewpoints of sub characters. When this technology is applied to a game, it is possible to recognize the position of one's own main character and the like from the images from the viewpoints of the sub characters. This makes it possible to realize a new visual effect and enhance gameability.

12 Claims, 13 Drawing Sheets

FOREIGN PATENT DOCUMENTS

| JP | 2001-096062 | 4/2001 |
|---|---|---|
| JP | 2001246150 | 9/2001 |
| JP | 2002-035427 | 2/2002 |
| JP | 2002-358542 | 12/2002 |

OTHER PUBLICATIONS

Notification of Reason(s) for Refusal dated Oct. 14, 2008, from the corresponding Japanese Application.

Weekly Dreamcast Magazine, Softbank Publishing Co. Ltd., Feb. 16, 2001, vol. 18, No. 4, Serial No. 324, p. 110, upper column.

International Search Report dated Aug. 31, 2004 for corresponding International Application No. PCT/JP2004/007970.

Weekly Dreamcast Magazine, vol. 18, No. 4, Feb. 16, 2001, p. 110.

International Preliminary Report on Patentability dated Mar. 23, 2006, for corresponding International Application No. PCT/JP2004/007970.

Box V of the Written Opinion of the International Searching Authority, for corresponding International Application No. PCT/JP2004/007970.

Supplemental European Search Report dated Aug. 9, 2011, from the corresponding EP04745680.

* cited by examiner 102a　　　102b

IMAGE DISPLAY APPARATUS, IMAGE DISPLAY METHOD, AND IMAGE DISPLAY SYSTEM

CROSS-REFERENCE TO RELATED APPLICATION

This application is a continuation of International Application PCT/JP2004/007970 filed on Jun. 8, 2004, now pending, and claims priority from Japanese Patent Application 2003-166403 filed Jun. 11, 2003, the contents of which are herein wholly incorporated by reference.

TECHNICAL FIELD

The present invention relates to an image display technology, and more particularly to a technology for displaying images pertaining to objects moving in a virtual space.

BACKGROUND ART

With the growth of computer processing power, a variety of image processing technologies have been achieved. Particularly in games where characters are operated in a virtual space, it is visual effects that enhance the impression of the games. The importance thereof has been on the increase significantly in recent years.

DISCLOSURE OF THE INVENTION

Problems to be Solved by the Invention

In the game industry, it has thus been an essential factor in providing original gameability to elaborate image display for the sake of differentiation from other games. Since the quality of visual effects dominates the popularity of the games, game development is often oriented so as to devote efforts to achieving new visual expression techniques. Besides, not only in the game industry but also in all industries that provide virtual images, the development of novel image display technologies for attracting interest of users has been a focus of attention.

It is thus an object of the present invention to provide a technology for realizing a new visual effect and a technology for providing new gameability.

Means to Solve the Problems

To achieve the foregoing object, one of the aspects of the present invention provides an image display apparatus comprising a first processing unit which displays a main image from a viewpoint of a first moving object to be operated by a user in a virtual space; and a second processing unit which switches an image from the main image to a sub image from a viewpoint of a second moving object out of moving objects other than the first moving object, and displaying the same.

Another aspect of the present invention relates to an image display method comprising: calculating a direction where a second moving object is with respect to a first moving object to be operated by a user in a virtual space; and displaying an image pertaining to the second moving object if a direction instructed by the user and the direction determined by the calculation coincide with each other.

Moreover, yet another aspect of the present invention provides an image display apparatus comprising: a management unit which performs progress management on a game where scenarios progress based on linkage of a plurality of subjects; a storing unit which stores predetermined order of progression of scenarios; and a processing unit which displays an image reflecting a state of progress of the game and the order of progression of scenarios.

Furthermore, yet another aspect of the present invention provides an image display system comprising a plurality of image display apparatuses connected via a network, wherein movements of moving objects to be operated by users of the respective image display apparatuses in a virtual space are reflected upon images of the other image display apparatuses. In this image display system, the image display apparatuses each comprise: a first processing unit which displays a main image from a viewpoint of a first moving object to be operated by its user in the virtual space; and a second processing unit for switching an image from the main image to a sub image from a viewpoint of a second object to be operated by another user, and displaying the same.

Incidentally, any combinations of the foregoing components, and any expressions of the present invention converted from/into methods, apparatuses, systems, recording media, computer programs, and the like are also intended to constitute applicable aspects of the present invention.

Advantage of the Invention

According to the image display apparatus of the present invention, it is possible to achieve new image display. Moreover, according to the image display apparatus of the present invention, this processing technology can be applied to a game for enhanced gameability.

BEST MODE FOR CARRYING OUT THE INVENTION

Hereinafter, description will be given of an embodiment in which the image processing technology of the present invention is applied to a game. A game apparatus according to the embodiment provides a game in which one large flow of story consists of a group of a plurality of scenarios. Incidentally, while the entire story can also be called a scenario, the term "scenario" shall hereinafter refer to each individual one of the scenarios that constitute the entire story unless otherwise specified. In scenarios, various moving objects, or characters, are set to be protagonists, i.e., playable characters to be operated by users out of a number of characters in the game. In this game, there is no specific protagonist but various characters who serve as protagonists in respective scenarios. Games like this will be called "multi-character games." Of such multi-character games, the present embodiment deals with a survival multi-character game whose goal is to survive opponent characters.

For easy understanding of the present embodiment, description will initially be given of the flow of the game.

In this game, characters operated by users have the capability of sensing images in other characters' views as if they see by themselves. Seeing an image from the viewpoint of another character will be referred to as "sight-jacking." The closer the characters are to each other, the clearer images they can see in the others' views and the clearer sound they can hear in the others' hearing. Characters to be sight-jacked are often opponent characters, and the users can grasp the physical relationship and distances between playing characters and opponent characters by watching the images from the viewpoints of the opponent characters. Based on this, the users get free of opponent characters or run opponent characters down to clear the scenarios.

The users operate scenario-specific characters to clear the respective scenarios. Not only the characters to operate but situations, scenario goals, clearing conditions, and the like also vary from one scenario to another. The number of clearing conditions is not limited to one. Subsequent branches may vary depending on which condition a scenario ends with. The game apparatus according to the present embodiment achieves the foregoing visual effects, user assistance for game operation, and so on by using a new image display technology.

FIG. 1 shows the configuration of a game apparatus 10 according to the embodiment of the present invention. The game apparatus 10 comprises an operation unit 12, an input acceptance unit 14, a key assignment unit 16, a switching unit 18, a processing unit 20, a progress management unit 26, a read unit 28, a storing unit 30, an output unit 32, a display 34, and a speaker 36. The game apparatus 10 is realized by a CPU, a memory, a program loaded into the memory, and the like, whereas this diagram shows functional blocks to be achieved by cooperation of the same. It will thus be understood by those skilled in the art that these functional blocks can be achieved in various forms including hardware alone, software alone, and a combination of these. Incidentally, the program may be recorded on a recording medium readable by the CPU, or may be supplied from exterior over a network.

The game apparatus 10 may be a dedicated game console or commonly-used computer which is owned by a user. The game apparatus 10 may be configured as a system including a server and a user terminal which are connected via a network. With the system configuration, the load on the user terminal may be reduced by providing the operation unit 12, the output unit 32, and the like on the user-terminal side while the processing unit 20 and other components for main processing are on the server side. Again, the user terminal may be a dedicated game console or commonly-used computer, or even a mobile terminal such as a PDA (Personal Digital Assistants) terminal and a cellular phone.

The operation unit 12 is a user interface for inputting instructions from the user. It may be a game controller, in which case the operation unit 12 comprises a plurality of keys (buttons) and joysticks. While watching game images appearing on the display 34, the user makes operations concerning the images, i.e., operations necessary for the progress of the game through the operation unit 12.

FIG. 2 is a diagram showing a network environment in which a plurality of game apparatuses 10 are connected. The plurality of game apparatuses 10 are connected via a network 11, and this network environment constitutes an image display system, or a game system in this example. The network 11 may be the Internet, an intranet, or other networks with various types of protocols. The game apparatuses 10 are configured to have a network connection function.

In this network environment, any one of the game apparatuses 10 may function as a server while the other game apparatuses 10 function as clients. A server for managing the progress of the game among the game apparatuses 10 may also be provided aside from the plurality of game apparatuses 10 shown in the diagram. In this case, the plurality of game apparatuses 10 may function as clients. Otherwise, each individual game apparatus 10 may operate independently. In any case, the plurality of game apparatuses 10 can achieve synchronized progress of the game by transmitting game operation instructions from the users to the other game apparatuses 10 over the network 11 and accepting game operation instructions in the other game apparatuses 10 over the network 11. This game system is configured as an image display system in which the movements of moving objects operated by the users of the respective game apparatuses 10 in a virtual space are reflected upon images on the other image display parts.

FIG. 3 shows a game console controller which is an example or the operation unit 12. This game console controller comprises a key group 50 consisting of ○ key, Δ key, □ key, and × key, two 360°-rotatable joysticks 52, a cross key 54, and so on. Incidentally, the operation unit 12 is not limited to the configuration as shown in FIG. 3, and may be such a user interface as a keyboard and a touch panel. Note that the operation unit 12 preferably has a structure capable of inputting arbitrary angles, like the joysticks 52.

Returning to FIG. 1, a medium 40 containing game data is inserted into the read unit 28. The medium 40 is a CD-ROM, DVD, or the like, for example, and contains such game data as AV data on game scenes and a game program. The game program recorded on the medium 40 may be in a form directly executable by the processing unit 20, or in a form executable by the processing unit 20 after decoding. The read unit 28 drives the medium 40 to read the game data recorded on the medium 40 into the storing unit 30. The processing unit 20 executes the read game data.

The processing unit 20 has a first processing unit 22 and a second processing unit 24. In the present embodiment, the first processing unit 22 performs processing for displaying an image from the viewpoint of a character to be operated by the user and sound processing corresponding to the image. Hereinafter, the character to be operated by the user will be referred to as "main character," and the image from the viewpoint of the main character will be referred to as "main image." As mentioned previously, in multi-character games, main characters to be operated by a user are set for respective scenarios.

The second processing unit 24 is chiefly responsible for image processing other than that of the main character. It performs processing for displaying images other than the main image and sound processing corresponding to those images. Hereinafter, images other than the main image will be referred to as "sub images." Sub images include, for example, an image from the viewpoint of a character other than the main character and an image that reflects the relationship between scenarios. Hereinafter, characters other than the main character will be referred to as "sub characters." Since the present embodiment is predicated on a survival multi-character game, those of the sub characters assumed as opponents will sometimes be referred to as "opponent characters." Moreover, a mode in which images from the viewpoints of sub characters are displayed will be referred to as "sight-jack mode." A mode in which images reflecting the relationship between scenarios are displayed will be referred to as "link navigation mode." In the "link navigation mode," the user can check the relationship between scenarios. Incidentally, the functions of the first processing unit 22 and the second processing unit 24 in the processing unit 20 are achieved by a computer such as the CPU.

In the game provided by the game apparatus 10, the user operates the main character during normal progress of scenarios while the main image is displayed on the display 34. Sub images are displayed on the display 34 as appropriate, including when attempting to check the positions of opponent characters and when attempting to check the relationship between scenarios. Providing that to clear the scenarios requires that sub images be checked efficiently, it is possible to attract the interest of the user to the game.

The progress management unit 26 performs progress management on the game in which the scenarios progress based on linkage of a plurality of subjects. In the multi-character game of the present embodiment, the scenarios have respective main characters. The relationship between these characters is determined so that a main character in a certain scenario must complete a predetermined event in order to move on to an event in another scenario. The progress management unit 26 manages such a state of progress of the game. For example, if the completion of an event A is conditional to moving on to another event B, the game apparatus 10 may notify the user that the event A must be done before the event B. Incidentally, the progress management unit 26 not only establishes consistency among the scenarios but may establish consistency within each single scenario as well. Since the progress management unit 26 manages the state of progress of the game, the user can recognize the necessity of linkage between a plurality of main characters, i.e., of cooperation between the characters in the game.

FIG. 4 shows an example of the main image to be displayed on the display 34. In this example, the main image is expressed as an image including the image from the viewpoint of the main character, i.e., an image taken from behind the main character. How to express the main image is one of essential renditions. The image taken from behind the main character makes it possible for the user to see the image in the viewing direction of the main character and to see the main character objectively as well, thereby enhancing the realism of the game. Note that the image of the main character may be excluded from the main image so that an image purely from the viewpoint of the main character is displayed. In either case, the main image according to the present embodiment has only to include the image from the viewpoint of the main character.

FIG. 5(*a*) shows an example of a sub image to be displayed on the display 34. This sub image is an image from the viewpoint of an opponent character or sub character. In this example, the opponent character is in a position capable of seeing the main character directly, i.e., in a position with no obstruction up to the main character. By watching this sub image, the user recognizes that an opponent character approaches the left side of the main character and a danger is coming.

FIG. 5(*b*) shows another example of the sub image to be displayed on the display 34. This sub image is also an image from the viewpoint of an opponent character. In this sub image, the opponent character is in a position incapable of seeing the main character directly. In the diagram, the symbol or mark "+" indicates the direction where the main character is. In the shown state, the main character is on the opposite side of the tree. The size of the mark + shows the distance between this opponent character and the main character. The closer the distance, the greater the mark + is shown; or conversely, the farther, the smaller the mark + is shown. This makes it possible for the user to grasp the distance between the main character and the opponent character intuitively. By watching this sub image, the user recognizes the direction and distance of the opponent character, and determines the subsequent moving direction and the like of the main character. Incidentally, the symbol to be displayed is not limited to the mark "+". Symbols of different shapes may also be used. Besides, the main character may be symbolized not only when the opponent character is in a position incapable of seeing the main character directly but when capable of seeing it directly as well. Furthermore, when incapable of seeing it directly, the main character may be rendered translucent or as such, instead of symbolic representation, so that the user is notified intuitively that the opponent character is in a position incapable of seeing it directly.

The sub images shown in FIGS. 5(*a*) and 5(*b*) appear on the display 34 when the operation unit 12 is operated to enter the "sight-jack" mode from the state where the main image is displayed. Moreover, the main image shown in FIG. 4 appears on the display 34 when a predetermined operation is made from the operation unit 12 in the state where a sub image is displayed. The input acceptance unit 14 accepts a mode switching instruction from the operation unit 12, and transmits it to the switching unit 18. Receiving this mode switching instruction, the switching unit 18 selects either the first processing unit 22 or the second processing unit 24, and switches the display image from the main image to a sub image or from a sub image to the main image.

FIG. 6 shows the configuration of the first processing unit 22. The first processing unit 22 has a main image processing unit 60 and a sound processing unit 62. The main image processing unit 60 performs processing for displaying the image from the viewpoint of the main character, and the sound processing unit 62 performs sound processing corresponding to the image. The main image processing unit 60 and the sound processing unit 62 process the game data read from the medium 40 to the storing unit 30, based on operation instructions input by the user. Through this processing, the main character is operated in the virtual space. Image data and sound data reflecting the operation instructions from the user are supplied to the output unit 32, and are output from the display 34 and the speaker 36, respectively. When scenarios are cleared, the first processing unit 22 records it into the storing unit 30.

FIG. 7 shows the configuration of the second processing unit 24. The second processing unit 24 has a sub image processing unit 70 and a sound processing unit 90. The sub image processing unit 70 performs processing for displaying images from the viewpoints of sub characters, images showing the relationship between scenarios, and the like. The sound processing unit 90 performs sound processing corresponding to the images. Like the main image processing unit 60 and the sound processing unit 62 of the first processing unit 22, the sub image processing unit 70 and the sound processing unit 90 process the game data read into the storing unit 30 based on operation instructions input by the user.

The sub image processing unit 70 has an image mode determination unit 72, a lock determination unit 74, an instructed direction detection unit 76, a position detection unit 78, a sub image generation unit 80, and an information acquisition unit 82. The image mode determination unit 72 determines which mode is selected via the operation unit 12, the "sight-jack mode" or the "link navigation mode."

If the sight-jack mode is selected, the lock determination unit 74 determines whether or not the sub image is fixed to an image from the viewpoint of a certain opponent character. The situation that the sub image is fixed refers to the case where the user, when in the sight-jack mode the last time or even before, selected an opponent character to watch, stored it to the storing unit (See FIG. 1), and exited the sight-jack mode without unlocking the sight. This sight lock can be used to register an opponent character in the storing unit 30 so that the main image can be switched to the image from the viewpoint of the opponent character instantaneously by a simple operation on the operation unit 12 when the user knows that the opponent character is in the direction where the main character is headed. When the sub image is fixed to the image from the viewpoint of a certain opponent character, the image from the viewpoint of the opponent character appears on the display at the instant when the user switches the image from the main image to the sub image.

If the sight is not fixed and the user tilts a joystick 52 of the operation unit 12, the instructed direction detection unit 76 checks for the presence or absence of any opponent character in the direction toward which the joystick 52 is tilted. The game controller shown in FIG. 3 has two joysticks 52. For example, the left joystick 52 is used for the purpose of instructing the direction. The joystick 52 may be tilted in any direction, back and forth and around. Here, the front direction shall be the viewing direction of the main character. With reference to the facing direction of the main character, i.e., the viewing direction of the main image, the instructed direction detection unit 76 detects the directions in which other sub characters are.

FIG. 8 is a diagram for explaining a sub character detecting function of the instructed direction detection unit 76. In this example, the reference direction is set to the viewing direction of a main character 100*a*. The directions in which sub characters lie are detected in terms of the clockwise angle around the position of the main character 100*a*. A sub character 100*b* is in the viewing direction, i.e., in the direction at an angle of 0. Similarly, a sub character 100*c* is in the direction at an angle of α, a sub character 100*d* at an angle of β, and a sub character 100*e* at an angle of γ.

Subsequently, the instructed direction detection unit 76 detects the tilt direction of the joystick 52, and determines the presence or absence of any sub character in that direction. The shown example deals with the case where the joystick 52 is tilted in the viewing direction, and the sub character 100 *b* falls within the range of predetermined angles across the direction, i.e., the hatched area. When the instructed direction detection unit 76 detects that the sub character 100*b* is in the direction instructed by the user, it transmits the detection result to the position detection unit 78. Specifically, the instructed direction detection unit 76 calculates the direction where a sub character is with respect to the main character, and detects that the sub character is in the user-instructed direction if the direction instructed by the user and the direction obtained by the calculation coincide with each other. Incidentally, in the present embodiment, the concept that directions coincide with each other covers the cases where the directions are approximate to each other. In other words, it covers the cases where the direction where a sub character is falls within the range of predetermined angles with respect to the direction instructed by the user. The position detection unit 78 determines whether or not the main character 100*a* is in the viewing angle of the sub character 100*b*.

FIG. 9(*a*) shows a situation where the main character 100*a* is in the viewing angle of the sub character 100*b*. FIG. 9(*b*) shows a situation where the main character 100*a* is not in the viewing angle of the sub character 100*b*. If in the viewing angle, the position detection unit 78 detects the direction where the main character 100*a* is in the sight of the sub character 100*b*. The direction where the main character 100*a* lies may be determined in terms of the clockwise or counterclockwise angle with reference to a direction that divides the viewing angle in two, i.e., the viewing direction of the sub character 100*b*. The results of detection in the instructed direction detection unit 76 and the position detection unit 78 are transmitted to the sub image generation unit 80.

Receiving the outputs of the instructed direction detection unit 76 and the position detection unit 78, the sub image generation unit 80 generates an image from the viewpoint of a sub character, or a sub image. Initially, if the instructed direction detection unit 76 detects that no sub character is in a predetermined direction with respect to the main character 100*a*, the sub image generation unit 80 generates a noise image as the sub image. The noise image may be the image of "white noise" which appears when TV programs end. Showing the noise image makes it possible for the user to recognize intuitively that no sub character is in the instructed direction.

On the other hand, if any sub character is in the predetermined direction instructed, the sub image generation unit 80 generates the image from the viewpoint of the sub character as the sub image. Incidentally, if the position detection unit 78 detects that the main character is in the viewing angle of the sub character, and some obstruction lies between the main character and the sub character, the direction where the main character lies is indicated with a symbol, such as the mark +, as shown in FIG. 5(*b*). The sub image generation unit 80 may express the distance between the main character and the sub character by the size of the mark +. Moreover, the sub image generation unit 80 may process the sub image or sound depending on the distance between the main character and the sub character specifically, the closer the distance, the higher the definition of the sub image or the louder the sound may be made. Conversely, the farther the distance, the lower the definition of the sub image or the softer the sound may be made. The foregoing audiovisual effects can be used to allow the user to grasp the distance and physical relationship between the main character and sub characters intuitively. This makes it possible to achieve a novel gameability.

The user can store certain sub characters into the storing unit 30 (See FIG. 1) in association with certain states of operation of the operation unit 12. Specifically, while the joystick 52 is operated to jack the sight of a sub character, any of the keys in the key group 50 shown in FIG. 3 is pressed to store the sub character into the storing unit 30. For example, while the image of the sight of a certain sub character is displayed, "○ key" in the key group 50 can be pressed to assign the image from the viewpoint of that character to ○ key. When the key assignment unit 16 receives a key input by the user via the input acceptance unit 14, it assigns the sub character to that key and stores it into the storing unit 30. The keys can be assigned, or sub characters can be registered, as many as the number of keys. In this example, the key group 50 consists of four keys, and it is therefore possible to store up to four sub characters into the storing unit 30.

Returning to FIG. 7, at the beginning of the sight-jack mode, the lock determination unit 74 determines whether or not the sight is locked. If locked, it instructs the position detection unit 78 to generate the sub image of the sub character. Moreover, if a plurality of keys are associated with respective sub characters, the user selects and presses a key so that the lock determination unit 74 instructs the position detection unit 78 to generate the sub image of the corresponding sub character. The position detection unit 78 detects the direction where the main character is in the sight of the sub character. The sub image generation unit 80 generates the image from the viewpoint of the sub character as the sub image. The processing of the position detection unit 78 and the sub image generation unit 80 is the same as described above.

FIG. 10 shows a processing flow for image display in the sight-jack mode. Initially, the lock determination unit 74 determines whether or not the sight of a certain sub character is locked in the sight-jack mode (S10). For example, if the main image is restored while the sight of a certain sub character is fixed in the previous sight-jack mode, it is determined in the next sight-jack mode that the sight is locked (Y at S10). If the sight is locked, the image from the viewpoint of the sub character is displayed on the display 34 (S12). When the main character does not appear directly in the sight of the sub character, the position detection unit 78 detects the direction where the main character is, and the sub image generation unit 80 shows the direction of the main character with the symbol in the image from the viewpoint of the sub character.

On the other hand, if the sight is not locked (N at S10), the noise image is displayed (S14). Subsequently, the presence or absence of a key input is determined (S16). If there is any key input (Y at S16), it is determined whether or not any sub character is assigned to that key (S18). If assigned (Y at S18), the image from the viewpoint of the corresponding sub character is displayed (S12). If not assigned (N at S18), the noise image continues to be displayed (S14).

If there is no key input (N at S16), the user operates the joystick 52 (S20) and the instructed direction detection, unit 76 detects the input angle of the joystick 52 (S22). The instructed direction detection unit 76 also detects positions where sub characters are, and determines the directions of the sub characters with respect to the viewing direction of the main character. Based on this, whether or not any sub character is in the direction instructed from the joystick 52 is determined (S24). If there is any sub character (Y at S24), the image from the viewpoint of the sub character is displayed (S12). If none (N at S24), the noise image is displayed (S14). When the joystick 52 is tilted to turn 360° around, the images from the viewpoints of the sub characters and the noise image appear alternately. The user can thus search the directions where the sub characters are around the main character easily.

If the user makes a key input with the image from the viewpoint of a sub character displayed (Y at S26), the key assignment unit 16 stores the input key and the sub character into the storing unit 30 in association with each other (S28). When the key is input in the subsequent sight-jack mode, it follows that the image from the viewpoint of the corresponding sub character appears. If there is no key input (N at S26), the key assignment will not be performed. Subsequently, whether or not to change mode, i.e., whether or not to exit the sight-jack mode is determined (S30). If the sight-jack mode is continued (N at S30), a user operation on the joystick 52 is accepted (S20), the input angle thereof is detected (S22), and the presence or absence of a sub character is detected (S24). The foregoing processing will be repeated subsequently. If an instruction to change mode is input by the user (Y at S30), the image display in the sight-jack mode is ended.

Hereinafter, description will be given of the configuration by which the game apparatus 10 provides the user with an image reflecting the state of progress of the game and the order of progression of scenarios. As mentioned previously, the game apparatus 10 provides a multi-character game in which the scenarios progress based on the linkage of a plurality of subjects. Returning to FIG. 1, the state of progress of scenarios in the multi-character game is managed by the progress management unit 26.

The storing unit 30 stores predetermined order of progression of scenarios. In multi-character games consisting of a plurality of scenarios, each individual scenario may exist independently. Nevertheless, some predetermined relationship can be established between scenarios so as to make the game sophisticated and attractive to users. For the purpose of describing the relationship between scenarios, assume the following three events:
(Event A) Seize a key from an opponent character;
(Event B) Put the seized key in a key box; and
(Event C) Taken the key out of the key box to unlock a door.

The foregoing three events are fulfilled in separate scenarios by respective main characters. Incidentally, these events may be required to be fulfilled in a single scenario. Otherwise, two of the events may be required to be fulfilled in one scenario while one is required to be fulfilled in another scenario. In any case, the order of progression of scenarios is set in advance, ad the event A, the event B, and the event C must be accomplished in this order. Hereinafter, this order of accomplishment of the events will be referred to as the order of progression of scenarios. That is, in the present embodiment, the order of progression of scenarios is used as a concept that covers not only the relationship in order between the scenarios but also the relationship in order between the events inside the scenarios.

FIG. 11 shows an example of the sub image to be displayed on the display 34 in the link navigation mode. For distinction from the images from the viewpoints of sub characters described above, the sub image in the link navigation mode will be referred to as "link navigation image." In situations where the main image is displayed, the user can make a predetermined key operation on the operation unit 12 to shift into the link navigation mode. In FIG. 7, when the image mode determination unit 72 determines that the link navigation mode is selected via the operation unit 12 (see FIG. 1), the information acquisition unit 82 acquires information necessary for generating the link navigation image from the storing unit 30.

The storing unit 30 contains the predetermined order of progression of scenarios. Besides, the progress management unit 26 performs progress management on the game where the scenarios progress based on the linkage of a plurality of subjects, thereby recording the state of progress of the game, or previously-completed scenarios (events) in particular, into the storing unit 30. For example, the storing unit 30 may contain a list of scenarios in the game so that when each scenario completes, the progress management unit 26 sets a flag for indicating the completion of the scenario on the list. The information acquisition unit 92 acquires from the storing unit 30 the information that indicates the state of progress of the game and the order of progression of scenarios.

The sub image generation unit 80 generates the sub image, or link navigation image, based on the state of progress of the game and the order of progression of scenarios acquired by the information acquisition unit 82. FIG. 11 is an initial screen of the link navigation image showing the order of progression of scenarios. It is shown that the character Y is to perform the event A, the character X the event B, and the character Z the event C in this order. The order between the events is indicated by the arrows. Checking the link navigation image, the user can recognize which scenario must be accomplished first and which character to proceed with the scenario. When the information acquisition unit 82 detects that there is a logical failure resulting from the action among a plurality of characters, it transmits the location of the failure to the sub image generation unit 80. The sub image generation unit 80 shows the failure location in the link navigation image.

Specifically, in the example of FIG. 11, it is logically impossible for the character X to complete the event B before the character Y completes the event A. Thus, when the user attempts to move on to the event B before the event A, the sub image generation unit 80 shows in the link navigation image that the event A should be done before the event B, so as to notify the occurrence of the logical failure to the user. For example, the sub image generation unit 80 displays completed events in color, and displays an event currently dealt with blinking. If the event B is blinking while the event A is not displayed as completed, the user can recognize that the event A should be done before the event B. Incidentally, a warning that the event A is yet to be done may be shown directly in the link navigation image. In any case, the logical failure resulting from the action among the plurality of characters is shown in the link navigation image so that the user can easily recognize that the event to deal with currently should be changed.

According to the game apparatus 10 of the present embodiment, it becomes possible to provide a game in which the relationship between scenarios has some implications, so that the user can proceed with the game smoothly based on the link navigation image. For example, the relationship between the scenarios may include puzzle-solving factors for enhanced gameability. Moreover, a new relationship can be dynamically established between scenarios depending on the condition with which a scenario is cleared. In that case, a new event is displayed on the link navigation image, which contributes to enhanced gameability significantly. As above, the game apparatus 10 can enhance the gameability and achieve smooth progress of the game by switching display between the main image and the sub images.

FIG. 12 is a diagram for explaining a method of processing a facial expression image of a character according to the present embodiment. In order to reduce the amount of calculation on image data, the game apparatus 10 of the present embodiment changes the facial expression of a character by using an α blending technique. The storing unit 30 stores a plurality of facial expression images which are texture data. The shown examples are an angry expression image 102a and a smiley expression image 102b.

FIG. 13 shows the configuration of the sub image processing unit 70 which performs the α blending. The sub image processing unit 70 comprises an emotion determination unit 110, a texture image selection unit 112, a moving image acquisition unit 114, and an insert unit 116. Incidentally, the display processing with the α blending is preferably incorporated not only into the sub image processing unit 70 but the main image processing unit 60 (see FIG. 6) as well, so that it is used as the function for creating facial expressions of characters in the entire processing unit 20.

The emotion determination unit 110 determines the emotion of a character from the status of the character. The emotions are typified by delight, anger, sorrow, and pleasure. Other examples include senses of fear, trouble, and urgency. The storing unit 30 stores in advance, in the form of texture images, a plurality of facial expression images corresponding to various possible emotions for a character to have in accordance with the game scenarios.

For example, the emotion determination unit 110 determines that the main character has a sense of fear when the main character is chased by an opponent character, and determines that it has a sense of relief when it gets away from the opponent character. As above, the emotion determination unit 110 determines the emotion of the character by grasping the situation that the character is in.

The texture image selection unit 112 selects the texture image of a facial expression from the storing unit 30 according to the emotion determined. The insert unit 116 inserts and displays it in a predetermined position onscreen, i.e., in the position of the character's face as the expression of the character. The movement of the character is rendered in the virtual space by using three-dimensional CG and the like.

When the emotion of the character changes, the texture image selection unit 112 selects the texture image of the changed emotion from the storing unit 30. The moving image acquisition unit 114 exercises α blending between the images of the expressions before and after the change, and acquires the series of moving images as a single object. As shown in FIG. 12, the moving image acquisition unit 114 can acquire a series of moving images from an angry expression to a smiley expression through the α blending between the angry expression image 102a and the smiley expression image 102b. This facilitates acquiring expressional variations according to emotional transition. The insert unit 116 inserts and displays this object in a predetermined position onscreen. As a result, an expressional transition corresponding to character's emotion can be achieved with a smaller amount of data calculation. In particular, this image processing technique can provide sufficient visual effects when it is applied to relatively simple images of relatively smaller areas onscreen, such as in expressing a transition between the closed- and open-eyed states of a character.

Up to this point, the present invention has been described in conjunction with the embodiment thereof, whereas the technical scope of the present invention is not limited to that of description of the foreign embodiment. The foregoing embodiment has been given solely by way of illustration. It will be understood by those skilled in the art that various modifications may further be made to combinations of the foregoing components, and all such modifications are also intended to fall within the scope of the present invention. Examples thereof will be given below.

The foregoing embodiment has assumed that a single user operates a main character in the multi-character game, whereas a plurality of users may operate their respective main characters. In that case, the plurality of users may cooperate to complete a plurality of events having predetermined order of execution in one scenario. They can proceed with the game smoothly by checking the link navigation image as appropriate. Moreover, when a plurality of game apparatuses 10 are connected via a network, the users on the respective game apparatuses 10 can switch display between the images from the viewpoints of the main characters they operate and the images from the viewpoints of characters the other users operate. They can thus check the states of the others without holding a conversation.

The present embodiment has also assumed that the moving objects are characters or persons, whereas the present invention is not limited thereto. The moving objects may be animals, or vehicles such as cars and airplanes. That is, the moving objects have only to be bodies that move in the virtual space, and may include ones that originally have no sense of sight, like a vehicle. Vehicles and others having no sense of sight may be regarded as the moving objects of the present invention when virtual viewpoints are given to the vehicles

INDUSTRIAL APPLICABILITY

The present invention is applicable to the field of image display.

DESCRIPTION OF REFERENCE NUMERALS

Figure 1:
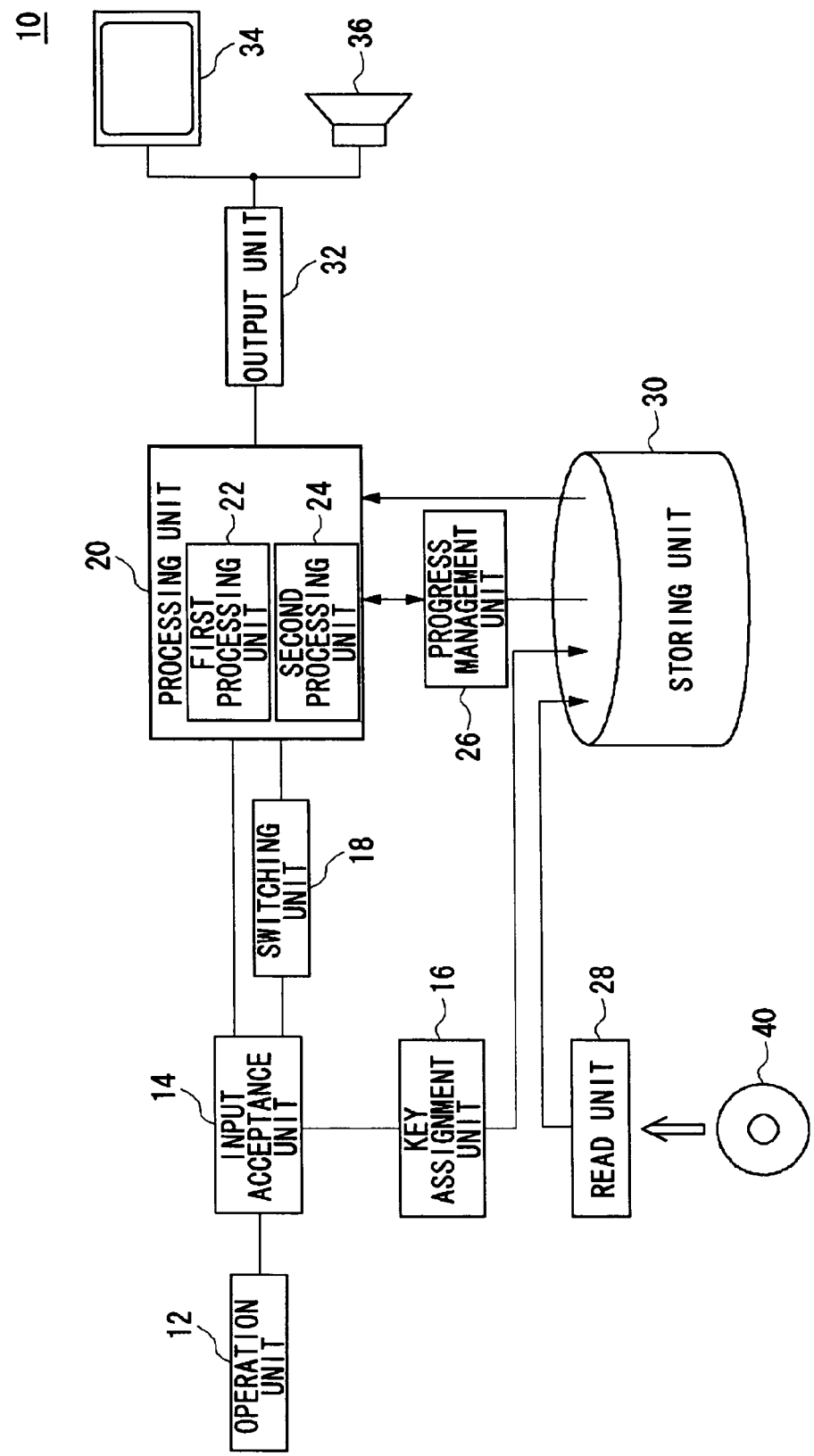
FIG. 1 is a diagram showing the configuration of a game apparatus according to an embodiment.
Figure 2:
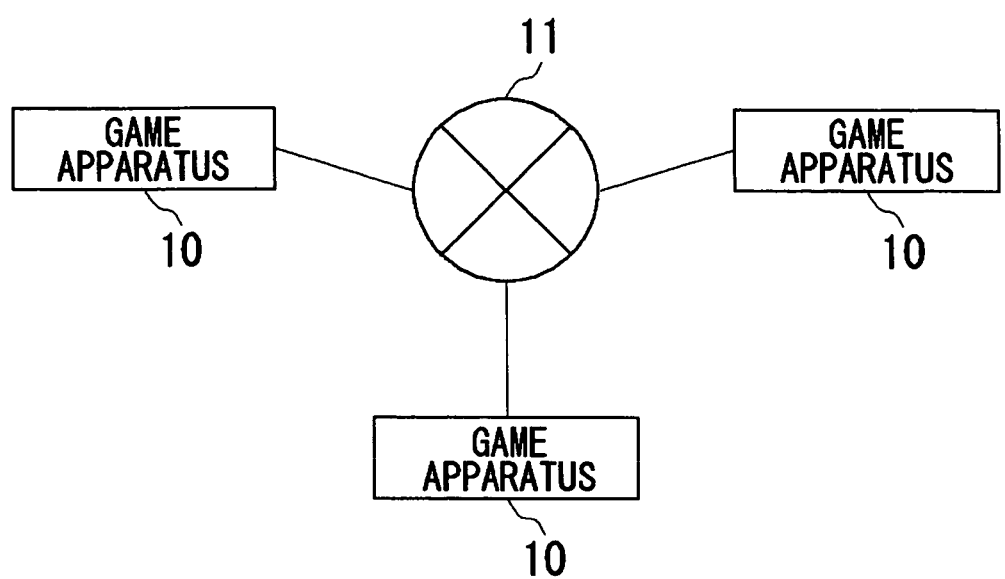
FIG. 2 is a diagram showing a network environment in which game apparatuses are connected.
Figure 3:
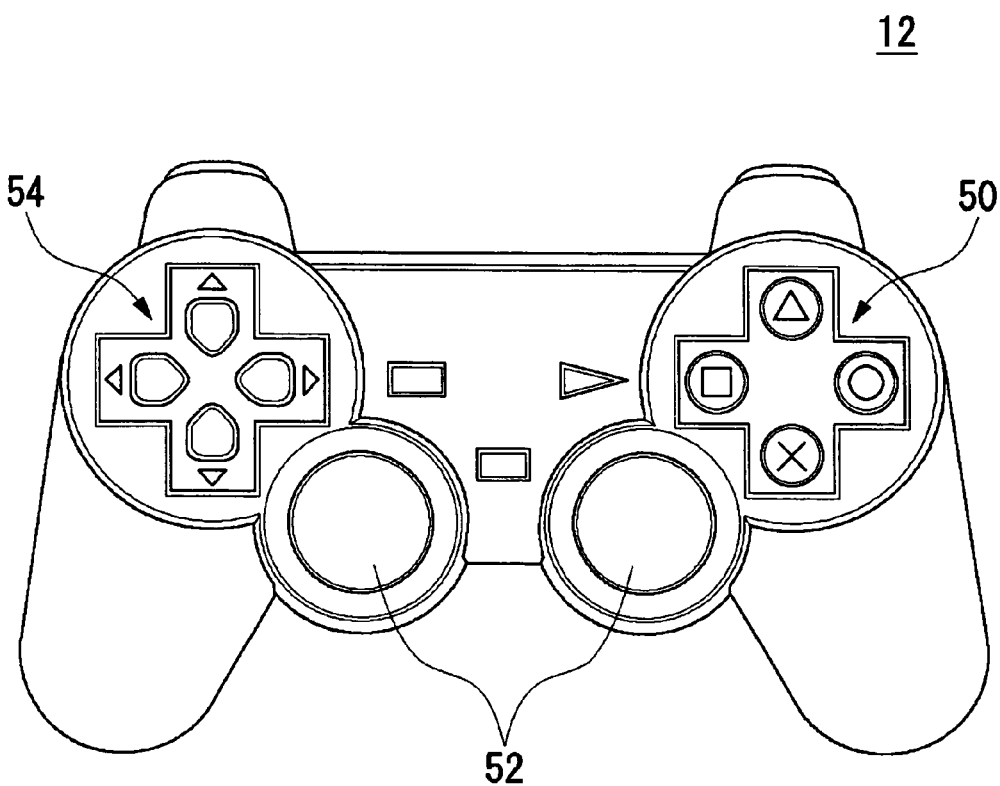
FIG. 3 is a diagram showing a game console controller which is an example of an operation unit.
Figure 4:
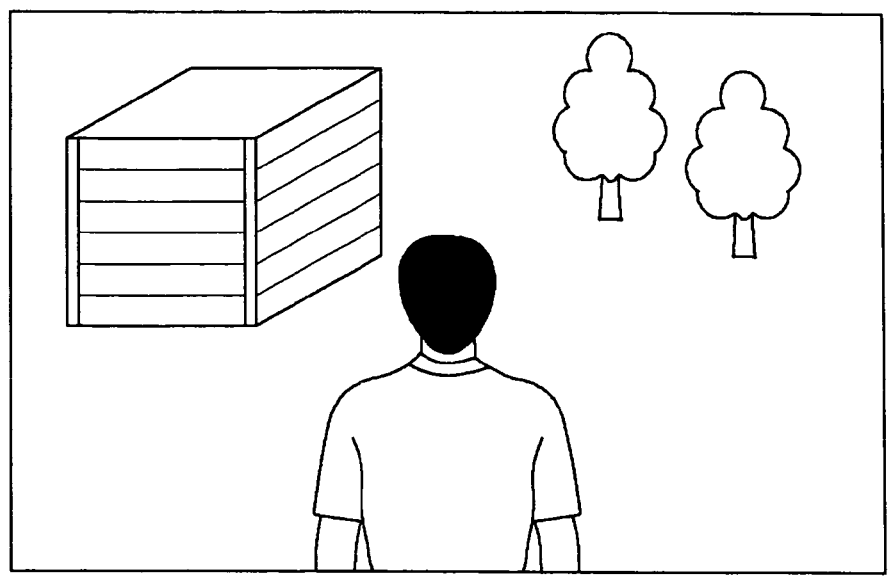
FIG. 4 is a diagram showing an example of a main image to be displayed on a display.
Figure 5A:
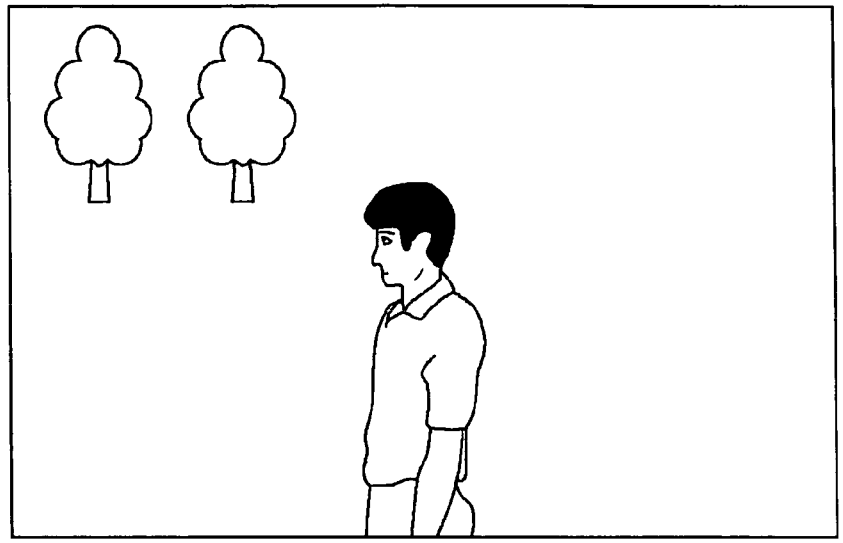
FIG. 5(a) is a diagram showing an example of a sub image to be displayed on the display.
Figure 5B:
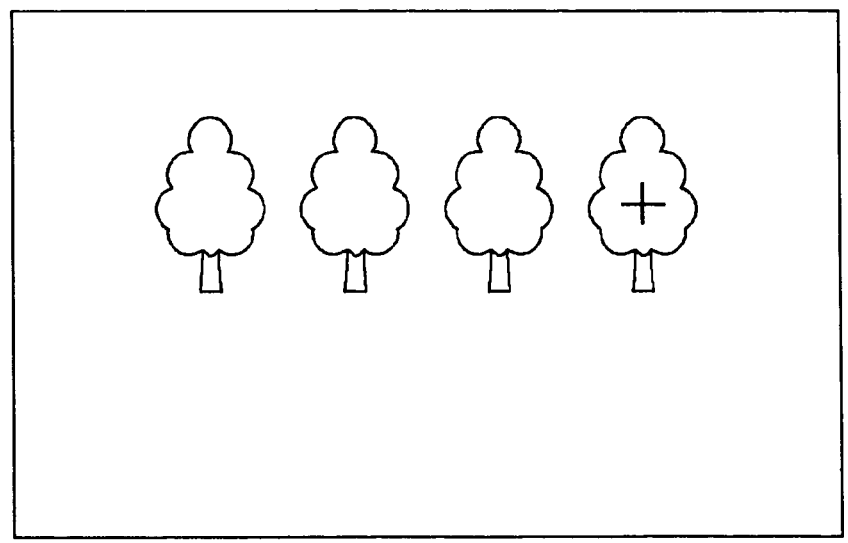
FIG. 5(b) is a diagram showing another example of the sub image.
Figure 6:
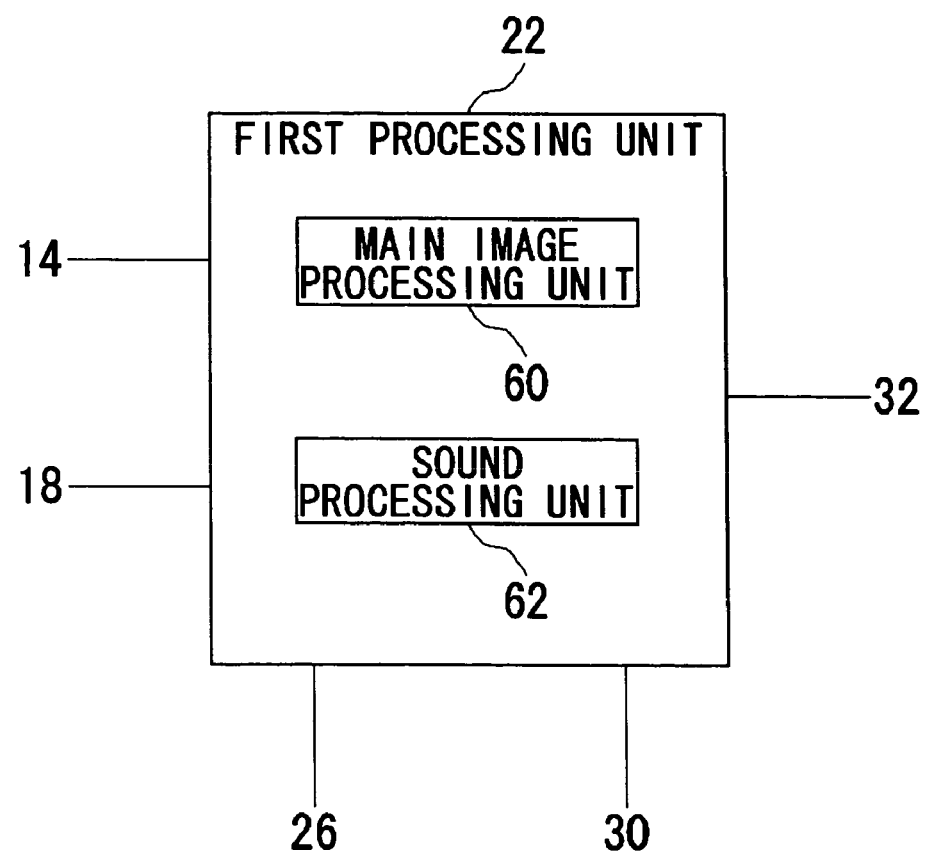
FIG. 6 is a diagram showing the configuration of a first processing unit.
Figure 7:
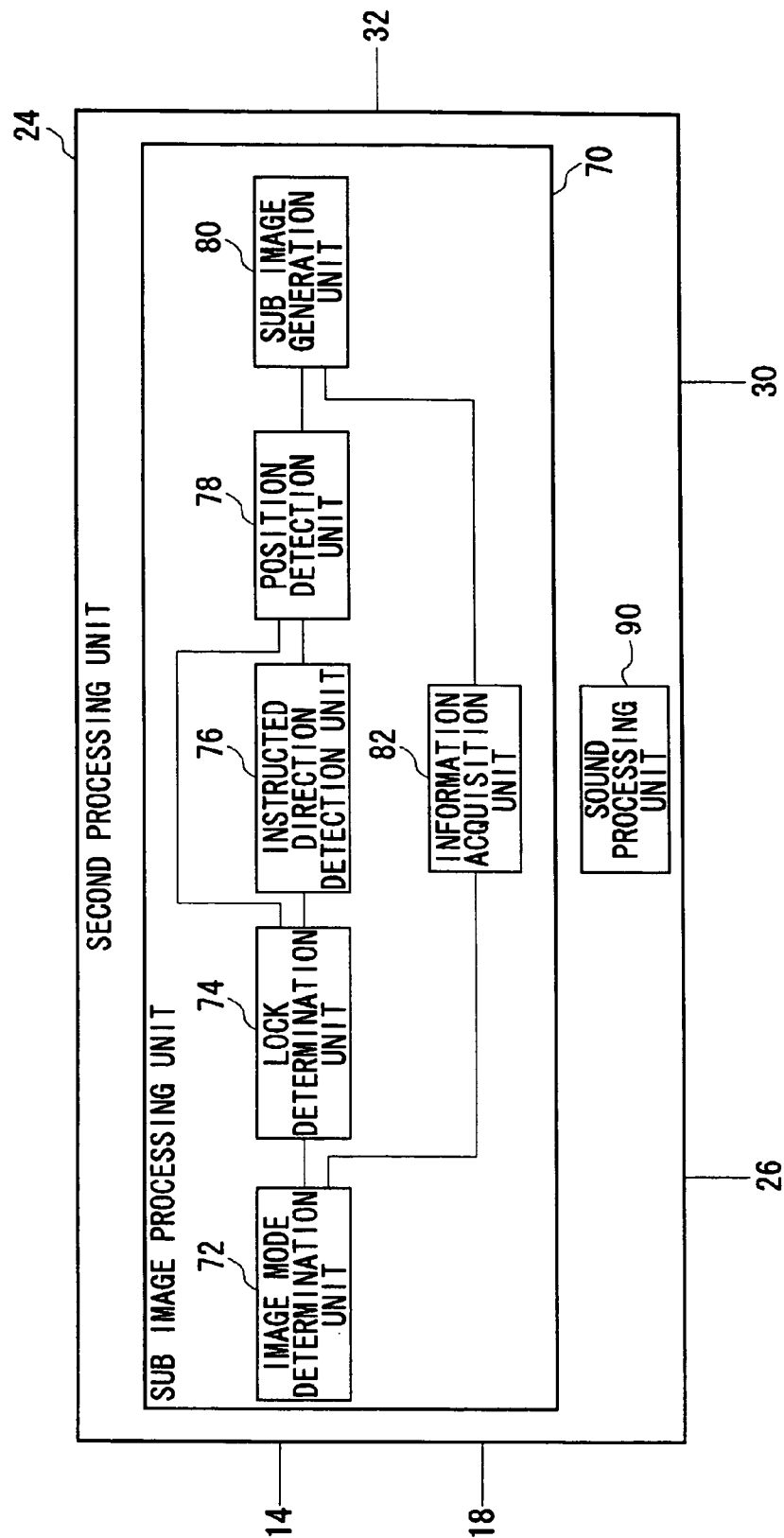
FIG. 7 is a diagram showing the configuration of a second processing unit.
Figure 8:
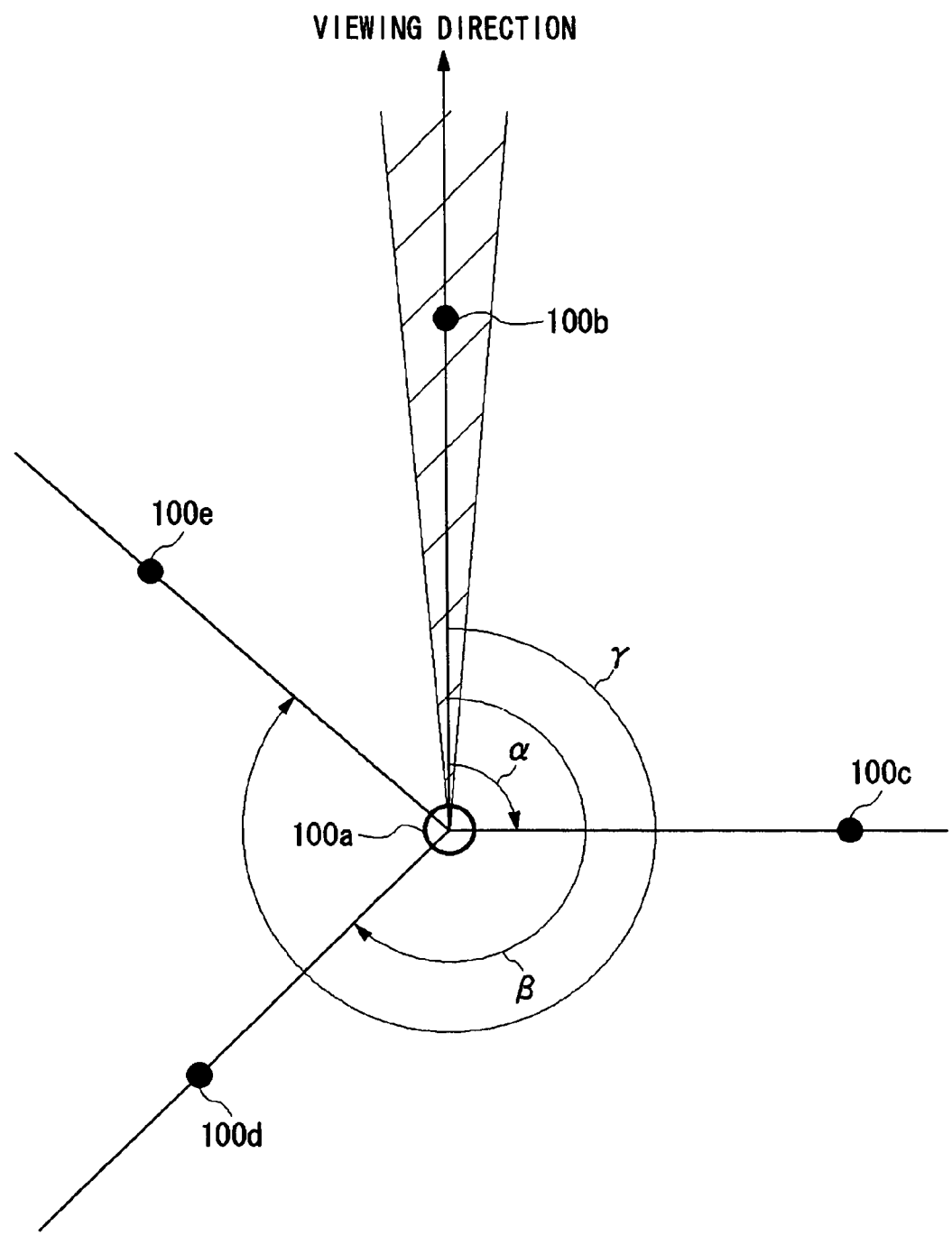
FIG. 8 is a diagram for explaining a sub character detecting function of an instructed direction detection unit.
Figure 9A:
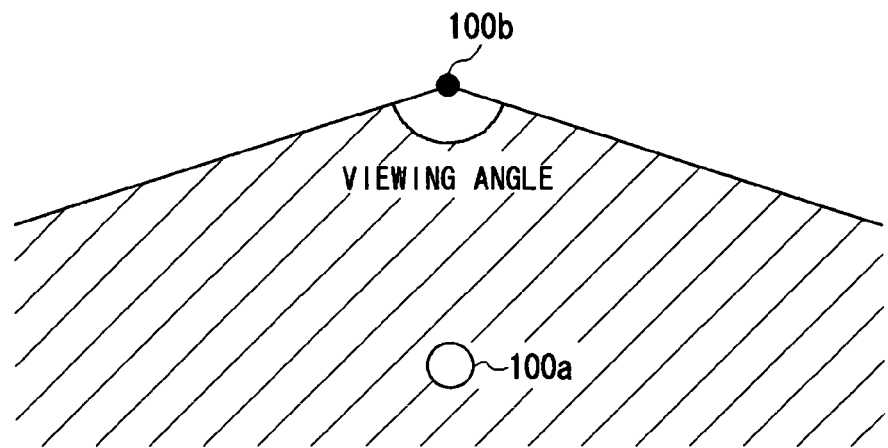
FIG. 9(a) is a diagram showing a state where a main character is in the viewing angle of a sub character.
Figure 9B:
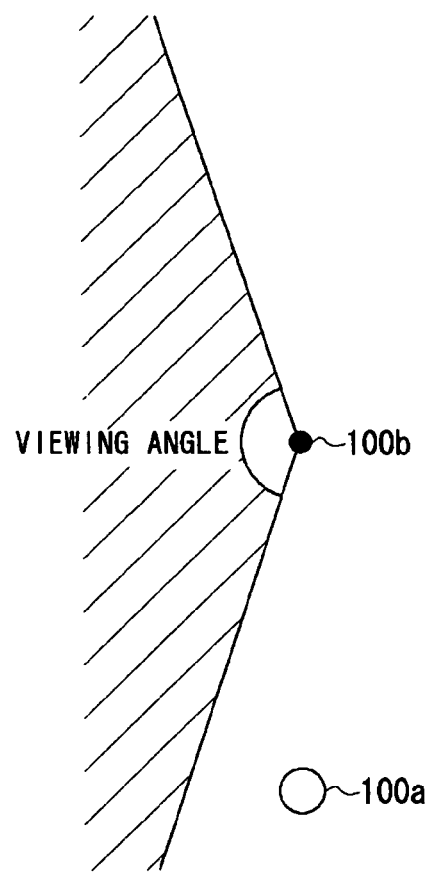
FIG. 9(b) is a diagram showing a state where not in the viewing angle.
Figure 10:
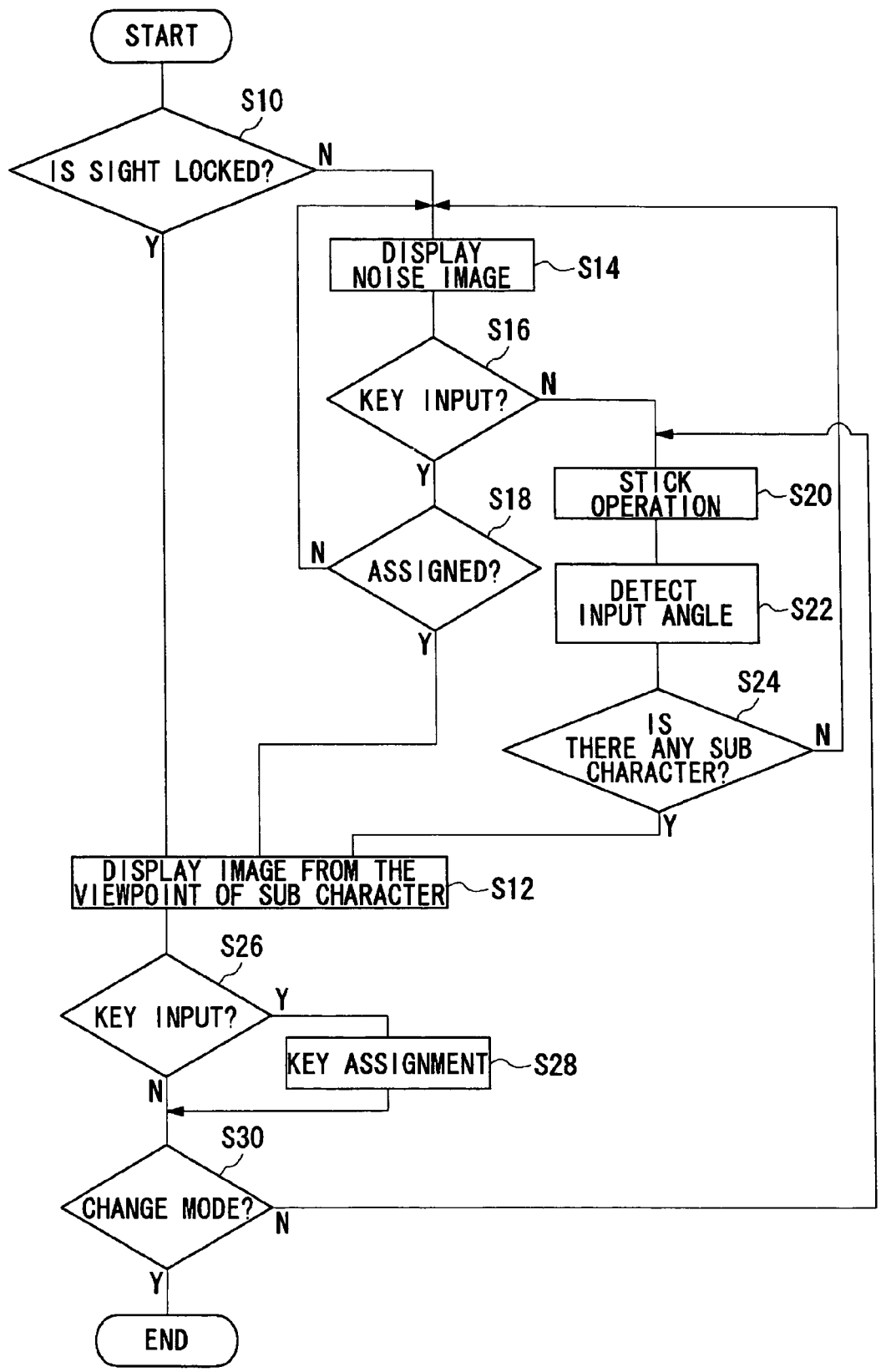
FIG. 10 is a chart showing a processing flow for image display in the sight-jack mode.
Figure 11:
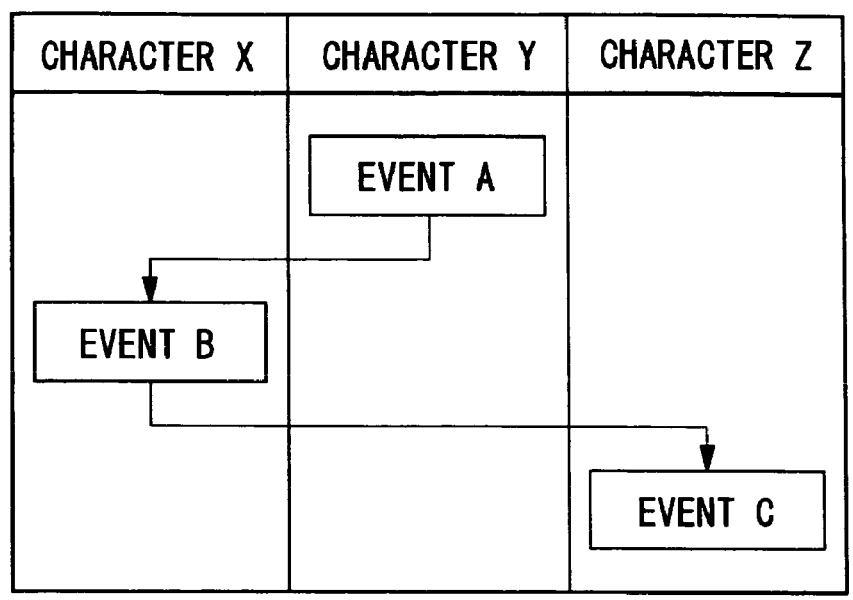
FIG. 11 is a diagram showing an example of a sub image to be displayed in a link navigation mode.
Figure 12:
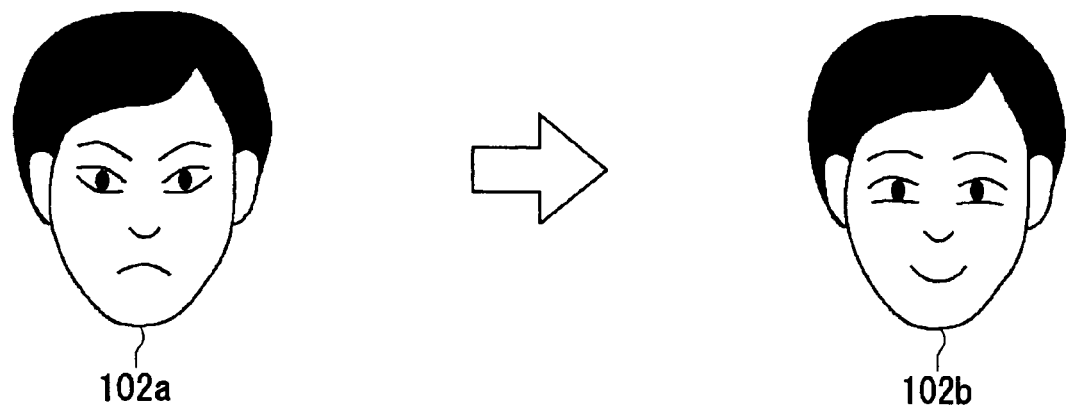
FIG. 12 is a diagram for explaining a method of processing facial expression images.
Figure 13:
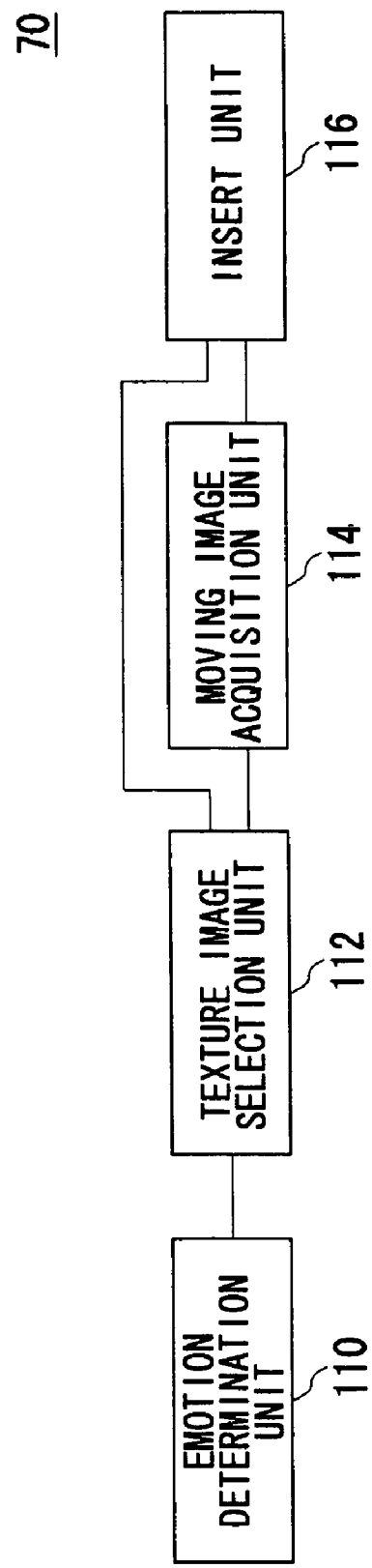
FIG. 13 is a diagram showing the configuration of the sub image processing unit which performs α blending.

10 . . . game apparatus, 11 . . . network, 12 . . . operation unit, 14 . . . input acceptance unit, 16 . . . key assignment unit, 18 . . . switching unit, 20 . . . processing unit, 26 . . . progress management unit, 30 . . . storing unit, 32 . . . output unit, 34 . . . display, 36 . . . speaker, 40 . . . medium

The invention claimed is:

1. An image display apparatus comprising:
a first processing unit which displays a main image from a viewpoint of a first moving object to be operated by a first user in a virtual space; and
a second processing unit which switches from the main image to a sub image from a viewpoint of a second moving object out of moving objects other than the first moving object, and displays the sub image, wherein
the second processing unit calculates where the second moving object is positioned with respect to the first moving object, and displays the sub image from the viewpoint of the second moving object when the second moving object calculated position coincides with a direction originating from the first moving object, the direction being instructed by said first user,
the first moving object is a first game character,
the second moving object is a second game character, and
the second game character is operated by a second user.

2. The image display apparatus according to claim 1, wherein the second processing unit displays a noise image as the sub image when no second moving object falls within a range of predetermined angles around the direction instructed by the first user.

3. The image display apparatus according to claim 1, further comprising:
a storing unit which registers the second moving object; and
an acceptance unit which accepts an instruction as to display of the sub image from a viewpoint of the registered second moving object, and wherein
after the image is restored from the sub image to the main image, the second processing unit displays the sub image pertaining to the registered second moving object based on the instruction accepted by the acceptance unit.

4. An image display apparatus according to claim 1, wherein
when the second processing unit displays the sub image, the second processing unit applies processing to sound corresponding to the sub image or definition of the sub image in accordance with a distance between the first and second moving objects, and
the closer the distance, the higher the definition of the sub image or the louder the sound is made, conversely, the farther the distance, the lower the definition of the sub image or the softer the sound is made.

5. The image display apparatus according to claim 1, further comprising:
a storing unit which registers the second moving object; and
an operation unit for the first user to make an image-related operation from, wherein
if the operation unit is operated while the sub image from the viewpoint of the second moving object is displayed, the storing unit registers the second moving object in association with the state of operation.

6. The image display apparatus according to claim 1, wherein
when the second processing unit displays the sub image, the second processing unit indicates with a symbol a direction where the first moving object is if there is an obstruction between the second moving object and the first moving object and expresses a distance between the first object and the second object by the size of the symbol.

7. The image display apparatus according to claim 1, wherein
when the second processing unit displays the sub image, the second processing unit applies processing to sound corresponding to the sub image or definition of the sub image in accordance with a distance between the first moving object and the second moving object.

8. An image display method comprising:
a first step of displaying a main image from a viewpoint of a first moving object to be operated by a first user in a virtual space; and
a second step of switching from the main image to a sub image from a viewpoint of a second moving object out of moving objects other than the first moving object, and displaying the sub image, wherein
the second step includes a step of calculating where the second moving object is positioned with respect to the first moving object, and displaying the sub image from the viewpoint of the second moving object when the second moving object calculated position coincides with a direction originating from the first moving object, the direction being instructed by said first user,
the first moving object is a first game character,
the second moving object is a second game character, and
the second game character is operated by a second user.

9. A program for making a computer exercise:
a first function for displaying a main image from a viewpoint of a first moving object to be operated by a first user in a virtual space; and
a second function for switching from the main image to a sub image from a viewpoint of a second moving object out of moving objects other than the first moving object, and displaying the sub image, wherein
the second function calculates where the second moving object is positioned with respect to the first moving object, and displays the sub image from the viewpoint of the second moving object when the second moving object calculated position coincides with a direction originating from the first moving object, the direction being instructed by said first user,
the first moving object is a first game character,
the second moving object is a second game character, and
the second game character is operated by a second user.

10. A computer-readable recording medium containing a program for making a computer exercise:
a first function for displaying a main image from a viewpoint of a first moving object to be operated by a first user in a virtual space; and a second function for switching from the main image to a sub image from a viewpoint of a second moving object out of moving objects other than the first moving object, and displaying the sub image, wherein the second function calculates where the second moving object is positioned with respect to the first moving object, and displays the sub image from the viewpoint of the second moving object when the second moving object calculated position coincides with a direction originating from the first moving object, the direction being instructed by said first, the first moving object is a first game character, the second moving object is a second game character, and the second game character is operated by a second user.

11. An image display system comprising a plurality of image display apparatuses connected via a network, movements of moving objects which are operated by users of the respective image display apparatuses in a virtual space being reflected upon images of the other image display apparatuses, the image display apparatuses each including:

a first processing unit which displays a main image from a viewpoint of a first moving object to be operated by a first user in the virtual space; and a second processing unit which switches from the main image to a sub image from a viewpoint of a second moving object to be operated by a second user, and displays the sub image, wherein the second processing unit calculates where the second moving object is positioned with respect to the first moving object, and displays the sub image from the viewpoint of the second moving object when the second moving object calculated position coincides with a direction originating from the first moving object, the direction being instructed by said first user, the first moving object is a first game character, the second moving object is a second game character, and the second game character is operated by the second user.

12. A method of displaying images on a plurality of image display apparatuses connected via a network, the method comprising:

a first step of displaying a main image from a viewpoint of a first moving object to be operated by a first user in a virtual space; and a second step of switching from the main image to a sub image from a viewpoint of a second object to be operated by a second user, and displaying the sub image, wherein the second step includes a step of calculating where the second moving object is positioned with respect to the first moving object, and displaying the sub image from the viewpoint of the second moving object when the second moving object calculated position coincides with a direction originating from the first moving object, the direction being instructed by said first user, the first moving object is a first game character, the second moving object is a second game character, and the second game character is operated by the second user.

* * * * *